US006243257B1

(12) United States Patent
Ester

(10) Patent No.: US 6,243,257 B1
(45) Date of Patent: Jun. 5, 2001

(54) IRONING BOARD ELECTRICAL OUTLET ATTACHMENT

(76) Inventor: Vivian L. Ester, 6654 S. Michigan Ave., Chicago, IL (US) 60637-3038

( * ) Notice: Subject to any disclaimer, the term of this patent is extended or adjusted under 35 U.S.C. 154(b) by 0 days.

(21) Appl. No.: 09/591,393

(22) Filed: Jun. 9, 2000

(51) Int. Cl.[7] .......... H02B 1/04

(52) U.S. Cl. .......... 361/625; 38/103; 200/51 R; 439/501

(58) Field of Search .......... 200/51 R, 310; 38/103, 104, 106, 108, 109; 248/51, 52, 205.3; 439/501, 502, 527, 535, 652; 361/600, 601, 625, 641, 643

(56) References Cited

U.S. PATENT DOCUMENTS

D. 373,869 9/1996 Stutzer et al. .
2,449,318 9/1948 Pitman et al. .
2,473,107 6/1949 Mendelsohn .
3,234,672 2/1966 Foster .
4,042,082 8/1977 Hellmiss et al. .
4,383,286 * 5/1983 Hicks .......... 361/695
4,867,701 9/1989 Wiand .
4,875,878 * 10/1989 Meyer .......... 439/501
5,057,039 * 10/1991 Persing et al. .......... 439/574
5,071,367 12/1991 Luu .
5,136,798 * 8/1992 Dooley et al. .......... 38/106
5,702,075 12/1997 Lehrman .
5,917,694 * 6/1999 Denny .......... 361/643
6,113,434 * 9/2000 Pate .......... 439/652

* cited by examiner

*Primary Examiner*—Gerald Tolin

(57) ABSTRACT

A ironing board electrical outlet attachment for a more convenient and easier way to plug in an iron. The ironing board electrical outlet attachment includes an electrical outlet member having a box-like structure, two electrical outlets securely mounted to a wall of the box-like structure, a retractable power cord, an on/off switch mounted to the wall of the box-like structure and connected to the power cord and the electrical outlets, a light-emitting member connected to the switch and disposed about the switch, a circuit breaker interconnecting the power cord with the electrical outlets, and conductive rings interconnecting the power cord to the switch, and further includes two clamping members each having a bracket member and a threaded member for securing the bracket to the ironing board and for mounting the electrical outlet member under the ironing board.

7 Claims, 2 Drawing Sheets

35
23
10
22
20
16
13
14
15
12

FIG 3
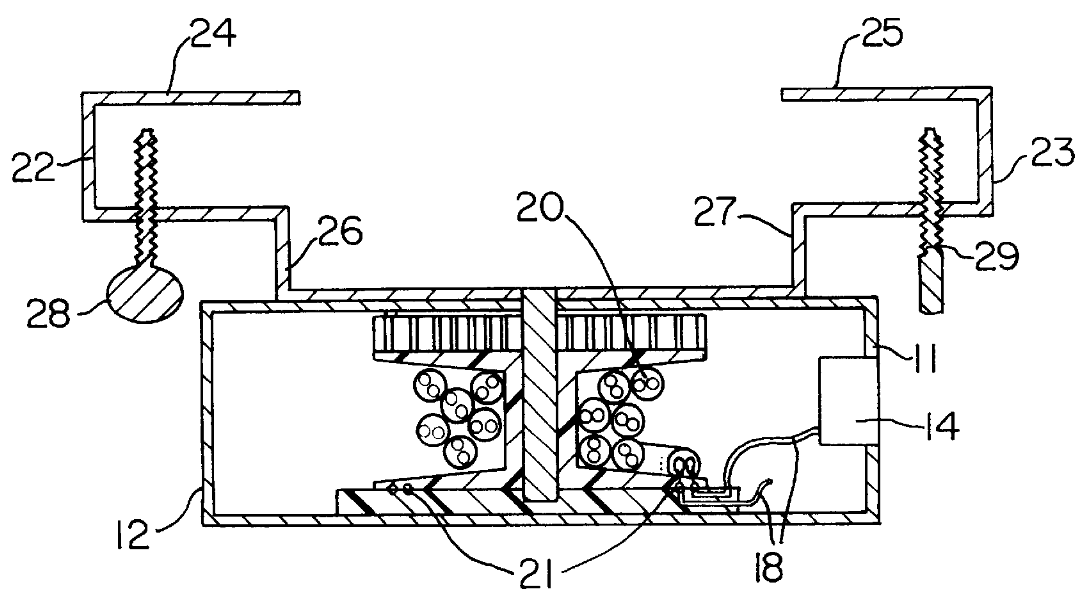
FIG 4
FIG 5
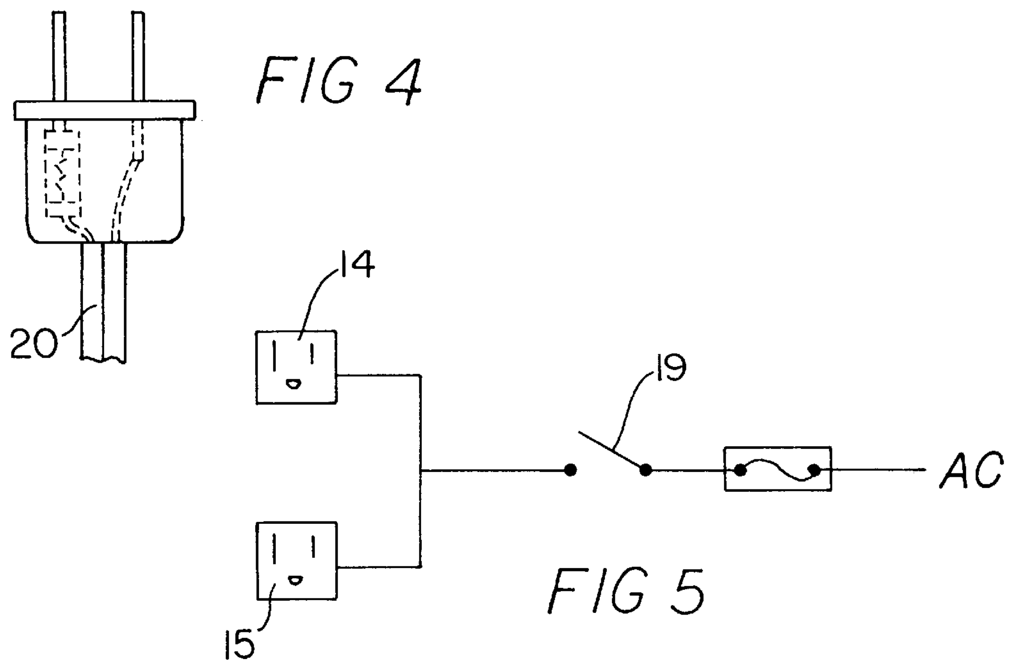

IRONING BOARD ELECTRICAL OUTLET ATTACHMENT

BACKGROUND OF THE INVENTION

1. Field of the Invention

The present invention relates to an attachable power strip for an ironing board and more particularly pertains to a new ironing board electrical outlet attachment for a more convenient and easier way to plug in an iron.

2. Description of the Prior Art

The use of an attachable power strip for an ironing board is known in the prior art. More specifically, an attachable power strip for an ironing board heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,702,075; U.S. Pat. No. 2,449,318; U.S. Pat. No. 5,071,367; U.S. Pat. No. 4,867,701; U.S. Pat. No. 2,473,107; and U.S. Pat. No. 4,042,082.

While these devices fulfill their respective, particular objectives and requirements, the aforementioned patents do not disclose a new ironing board electrical outlet attachment. The inventive device includes an electrical outlet member having a box-like structure, two electrical outlets securely mounted to a wall of the box-like structure, a retractable power cord, an on/off switch mounted to the wall of the box-like structure and connected to the power cord and the electrical outlets, a light-emitting member connected to the switch and disposed about the switch, a circuit breaker interconnecting the power cord with the electrical outlets, and conductive rings interconnecting the power cord to the switch, and further includes two clamping members each having a bracket member and a threaded member for securing the bracket to the ironing board and for mounting the electrical outlet member under the ironing board.

In these respects, the ironing board electrical outlet attachment according to the present invention substantially departs from the conventional concepts and designs of the prior art, and in so doing provides an apparatus primarily developed for the purpose of a more convenient and easier way to plug in an iron.

SUMMARY OF THE INVENTION

In view of the foregoing disadvantages inherent in the known types of an attachable power strip for an ironing board now present in the prior art, the present invention provides a new ironing board electrical outlet attachment construction wherein the same can be utilized for a more convenient and easier way to plug in an iron.

The general purpose of the present invention, which will be described subsequently in greater detail, is to provide a new ironing board electrical outlet attachment which has many of the advantages of the attachable power strip for an ironing board mentioned heretofore and many novel features that result in a new ironing board electrical outlet attachment which is not anticipated, rendered obvious, suggested, or even implied by any of the prior art an attachable power strip for an ironing board, either alone or in any combination thereof.

To attain this, the present invention generally comprises an electrical outlet member having a box-like structure, two electrical outlets securely mounted to a wall of the box-like structure, a retractable power cord, an on/off switch mounted to the wall of the box-like structure and connected to the power cord and the electrical outlets, a light-emitting member connected to the switch and disposed about the switch, a circuit breaker interconnecting the power cord with the electrical outlets, and conductive rings interconnecting the power cord to the switch, and further includes two clamping members each having a bracket member and a threaded member for securing the bracket to the ironing board and for mounting the electrical outlet member under the ironing board.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new ironing board electrical outlet attachment which has many of the advantages of the attachable power strip for an ironing board mentioned heretofore and many novel features that result in a new ironing board electrical outlet attachment which is not anticipated, rendered obvious, suggested, or even implied by any of the prior art an attachable power strip for an ironing board, either alone or in any combination thereof.

It is another object of the present invention to provide a new ironing board electrical outlet attachment which may be easily and efficiently manufactured and marketed.

It is a further object of the present invention to provide a new ironing board electrical outlet attachment which is of a durable and reliable construction.

An even further object of the present invention is to provide a new ironing board electrical outlet attachment which is susceptible of a low cost of manufacture with regard to both materials and labor, and which accordingly is then susceptible of low prices of sale to the consuming public, thereby making such ironing board electrical outlet attachment economically available to the buying public.

Still yet another object of the present invention is to provide a new ironing board electrical outlet attachment which provides in the apparatuses and methods of the prior art some of the advantages thereof, while simultaneously overcoming some of the disadvantages normally associated therewith.

Still another object of the present invention is to provide a new ironing board electrical outlet attachment for a more convenient and easier way to plug in an iron.

Yet another object of the present invention is to provide a new ironing board electrical outlet attachment which includes an electrical outlet member having a box-like structure, two electrical outlets securely mounted to a wall of the box-like structure, a retractable power cord, an on/off switch mounted to the wall of the box-like structure and connected to the power cord and the electrical outlets, a light-emitting member connected to the switch and disposed about the switch, a circuit breaker interconnecting the power cord with the electrical outlets, and conductive rings interconnecting the power cord to the switch, and further includes two clamping members each having a bracket member and a threaded member for securing the bracket to the ironing board and for mounting the electrical outlet member under the ironing board.

Still yet another object of the present invention is to provide a new ironing board electrical outlet attachment that prevents the user from tripping over the power cord for the iron.

Even still another object of the present invention is to provide a new ironing board electrical outlet attachment that allows the user more flexibility and maneuverability with the iron.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front cross-sectional view of the present invention.

FIG. 4 is a schematic view of the present invention showing in particular a plug.

FIG. 5 is an electronic schematic view of the present invention.

DESCRIPTION OF THE PREFERRED EMBODIMENT

Figure 1:
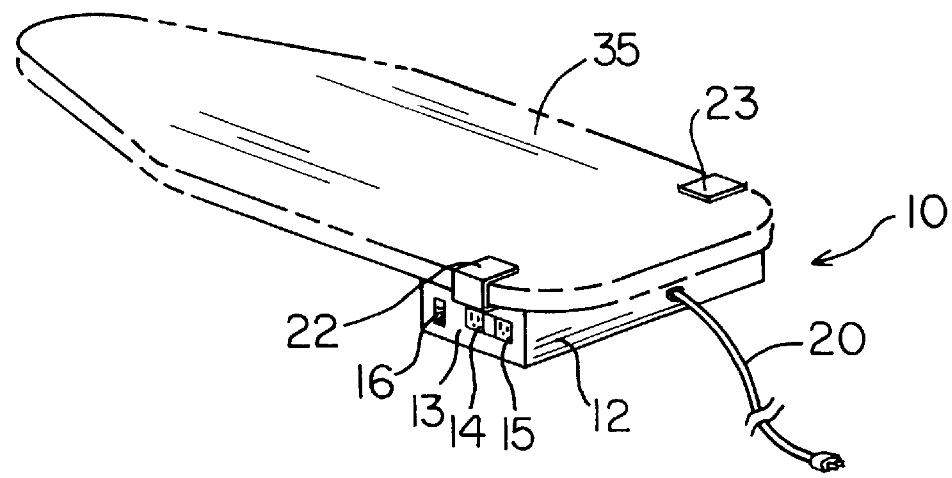
FIG. 1 is a perspective view of a new ironing board electrical outlet attachment according to the present invention as it is being used.
Figure 2:
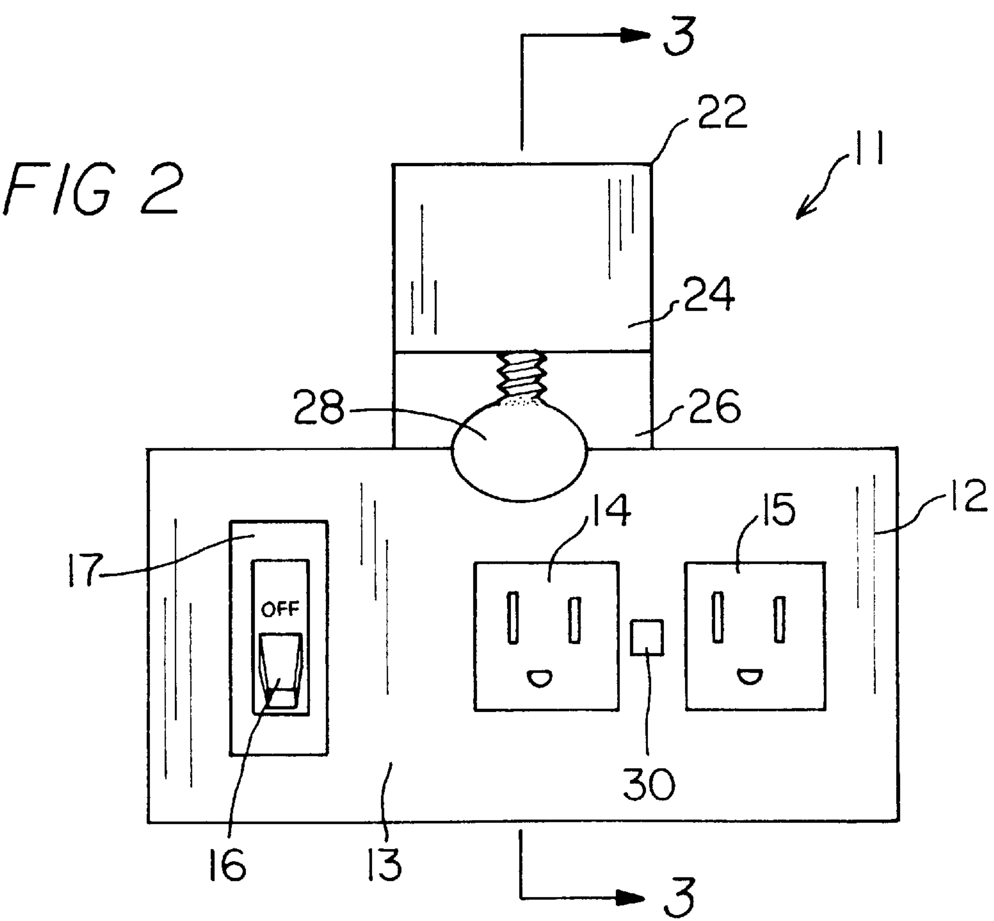
FIG. 2 is a side elevational view of the present invention.

With reference now to the drawings, and in particular to FIGS. 1 through 5 thereof, a new ironing board electrical outlet attachment embodying the principles and concepts of the present invention and generally designated by the reference numeral 10 will be described.

As best illustrated in FIGS. 1 through 5, the ironing board electrical outlet attachment 10 generally comprises an electrical outlet member 11 having a box-like structure 12, a plurality of electrical outlets 14,15 securely and conventionally mounted to and disposed in a wall 13 of the box-like structure 12, a switch 16 securely and conventionally mounted to and disposed in the wall 13 of the box-like structure 12 adjacent and connected to the electrical outlets 14,15 with wires 18. A retractable power cord 20 is connected to the switch 16 and is retractable within the box-like structure 12. A plurality of conductive rings 21 are disposed inside the box-like structure 12 and interconnect the power cord 20 to the switch 16 and the switch 16 to the electrical outlets 14,15, and a circuit breaker 19 is conventionally disposed between the electrical outlets 14,15 and the power cord 20. A reset button 30 is securely disposed and conventionally mounted in the wall 13 of the box-like structure 12 between the electrical outlets 14,15 for restoring energy to the electrical outlets 14,15.

A plurality of clamping members are securely attached to the box-like structure 12 and adapted to fasten about edges of an ironing board 35 for supporting the electrical outlet member 11 under the ironing board 35. Each of the clamping members includes a bracket member 22,23 having a C-shaped portion 24,25 and an L-shaped portion 26,27, and further includes a threaded member 28,29, which is threaded through a bottom wall of the C-shaped portion 24,25. Each of the L-shaped portions 25,26 is securely and conventionally attached to a top wall of the box-like structure 12. Each of the C-shaped portions 24,25 is removably and fastenably mounted about a respective one of the edges of the ironing board 35 with the threaded member 28,29, engaging the ironing board 35 between itself and an upper wall of the C-shaped portion 24,25. The clamping members are opposedly and fastenably mounted to opposite edges of the ironing board 35 near an end thereof.

A light-emitting means 17 is conventionally disposed about and connected to the switch 16, and being securely mounted to and disposed in the wall 13 of the box-like structure 12 for illuminating the switch 16 when the switch 16 is turned on to allow an electrical current to pass from the power cord 20 to the electrical outlets 14,15.

In use, instead of the user having to plug the cord of the iron into an electrical outlet in the wall, the user can simply plug the cord of the iron into one of the electrical outlets 14,15 on the box-like structure 12 and turn on the switch 16. By doing this, the user doesn't have to worry about the length of his/her power cord for the iron.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An ironing board electrical outlet attachment comprising:

an electrical outlet member having a box-like structure, at least one electrical outlet securely mounted to and disposed in a wall of said box-like structure, a switch securely mounted to and disposed in said wall of said box-like structure and connected to said electrical outlets, and a retractable power cord connected to said switch and being retractable within said box-like structure, a circuit breaker interconnecting said electrical outlets and said power cord;

a plurality of clamping members securely attached to said box-like structure and adapted to fasten about edges of an ironing board for supporting said electrical outlet member under said ironing board; and wherein each of said clamping members includes a bracket member having a C-shaped portion and an L-shaped portion, and further includes a threaded member which is threaded through a bottom wall of said C-shaped portion.

2. An ironing board electrical outlet attachment as described in claim 1, further includes a light-emitting means disposed about and connected to said switch, and being securely mounted to and disposed in said wall of said box-like structure for illuminating said switch when said switch is turned on to allow an electrical current to pass from said power cord to said electrical outlets.

3. An ironing board electrical outlet attachment as described in claim 1, wherein each said L-shaped portion is securely attached to a top wall of said box-like structure.

4. An ironing board electrical outlet attachment as described in claim 1, wherein each said C-shaped portion is removably and fastenably mounted about a respective one of said edges of said ironing board.

5. An ironing board electrical outlet attachment as described in claim 1, wherein said clamping members are opposedly and fastenably mounted to opposite edges of said ironing board near an end thereof.

6. An ironing board electrical outlet attachment as described in claim 1, further includes a plurality of conductive rings interconnecting said power cord to said switch and said switch to said electrical outlets.

7. An ironing board electrical outlet attachment comprising:

an electrical outlet member having a box-like structure, a plurality of electrical outlets securely mounted to and disposed in a wall of said box-like structure, a switch securely mounted to and disposed in said wall of said box-like structure and connected to said electrical outlets, a retractable power cord connected to said switch and being retractable within said box-like structure, a circuit breaker interconnecting said electrical outlets with said power cord, a plurality of conductive rings disposed inside said box-like structure and interconnecting said power cord to said switch and said switch to said electrical outlets, and a reset button securely disposed and conventionally mounted in said wall between said electrical outlets for restoring energy to said electrical outlets;

a plurality of clamping members securely attached to said box-like structure and adapted to fasten about edges of an ironing board for supporting said electrical outlet member under said ironing board, each of said clamping members including a bracket member having a C-shaped portion and an L-shaped portion, and further including a threaded member which is threaded through a bottom wall of said C-shaped portion, each said L-shaped portion being securely attached to a top wall of said box-like structure, each said C-shaped portion being removably and fastenably mounted about a respective one of said edges of said ironing board, said clamping members being opposedly and fastenably mounted to opposite edges of said ironing board near an end thereof; and a light-emitting means disposed about and connected to said switch, and being securely mounted to and disposed in said wall of said box-like structure for illuminating said switch when said switch is turned on to allow an electrical current to pass from said power cord to said electrical outlets.

* * * * *